M. C. STAMM.
SIGNAL APPARATUS FOR AUTOMOBILES.
APPLICATION FILED NOV. 11, 1912.
1,096,571.
Patented May 12, 1914.
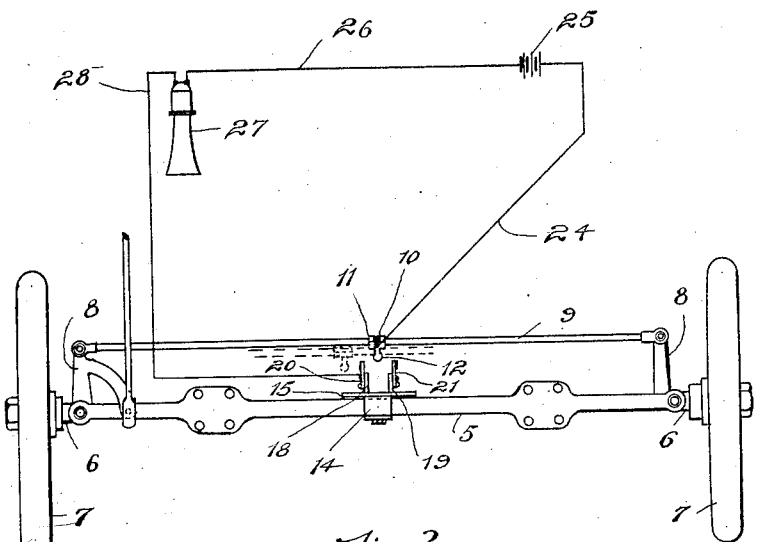
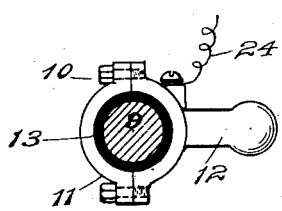
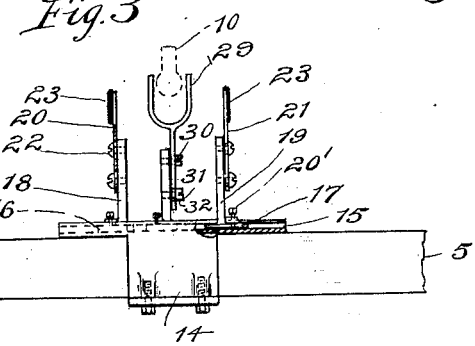
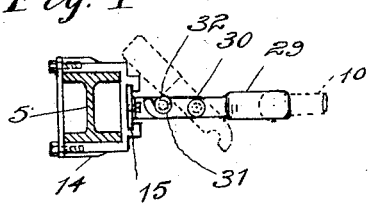
Witnesses:
Irene Forrest
C. B. Ringo.
Inventor,
Martin C. Stamm,
By Glenn S. Noble
Att'y.

UNITED STATES PATENT OFFICE.

MARTIN C. STAMM, OF CHICAGO, ILLINOIS.

SIGNAL APPARATUS FOR AUTOMOBILES.

1,096,571. Specification of Letters Patent. Patented May 12, 1914.

Application filed November 11, 1912. Serial No. 730,658

*To all whom it may concern:*

Be it known that I, MARTIN C. STAMM, a subject of the Emperor of Germany, residing at Chicago, in the county of Cook and State of Illinois, have invented certain new and useful Improvements in Signal Apparatus for Automobiles, of which the following is a specification.

It is well known that when an automobile driver is turning corners or turning around he is apt to be wholly engaged with the control and operation of the car so that he does not sound a horn or signal even if the car is supplied with the same, and accidents are liable to happen on account of such lack of warning.

The present invention relates to means whereby a horn or signal will be automatically sounded when an operator or driver turns the car, and also to protective means whereby a warning will be sounded if the car is started by some unauthorized person.

The objects of this invention are to provide a simple and efficient mechanism whereby a warning signal will be caused to operate when the front wheels of a car are turned, and also to provide an auxiliary device which may be arranged when the car is left by the driver or owner so that the warning will be sounded if any one attempts to steal or run away with the car, and also to provide such novel details of construction and arrangement of parts as will appear hereinafter.

In the accompanying drawings illustrating my invention; Figure 1 is a plan view indicating the front axle assembly and wheels as commonly used in automobiles, in connection with my horn or signal apparatus; Fig. 2 is a detail of one of the electric contacts; Fig. 3 is an enlarged detail of the parts applied to the axle; and Fig. 4 is a sectional end view of the parts shown in Fig. 3, with one of the contacts removed.

As indicated in these drawings, 5 represents the front axle of an automobile or other vehicle which is provided with the usual spindles 6, for the front wheels 7. These spindles are provided with steering arms 8, 8 which are connected by means of a steering cross-rod 9. This cross rod is shown as being located behind the axle, although in some instances it may be located in front thereof, the drawing merely indicating the well known construction of such devices. The wheels are turned by turning one of the arms 8, the movement of this arm being transmitted to the corresponding arm on the other side by means of the steering cross-rod 9. It will be seen that the rod 9 moves longitudinally of the axle, as well as slightly approaching the same as the wheels are turned. I take advantage of this relative movement of the axle and steering cross-rod to operate my signal apparatus although, such apparatus may in some instances be applied to other parts which are moved relatively with respect to each other when the wheels are turned. In the present instance I provide an electric contact member 10 which is applied to the steering cross-rod 9, and which is adapted to co-act with contact members secured to the axle 5. The contact 10 preferably comprises a clamp 11, which clamps around the cross-rod 9, one portion thereof being provided with a finger or projection 12 as clearly shown in Figs. 1 and 2. This contact is preferably insulated from the rod 9 by means of an insulating sleeve 13.

The axle 5 is provided with a clamp 14 which carries the contacts for engagement with the contact 10. Such contacts may be made relatively stationary, but I prefer to make them adjustable. In order to do this in a convenient manner, the clamp 14 is provided on the rear side with a groove 15 which is adapted to receive tongues 16 and 17 of the outwardly extending arms or brackets 18 and 19. These tongues are provided with set screws 20' so that the arms may be adjusted to any desired position longitudinally of the bracket. The arms 18 and 19 carry spring contacts 20 and 21, these contacts being held by means of screws 22 which pass through slots in the springs, thereby enabling the springs to be adjusted longitudinally of the arms. These springs or contacts are provided on their outer faces at their outer ends with plates or strips 23 of non-conducting material. The contact 10 is connected by means of a wire or conductor 24 with one terminal of a battery 25; the opposite terminal of this battery being connected by means of a wire 26 with one terminal of an electric horn or signal 27. Such signal may be any of the horns, bells or similar electric devices now in common use. The opposite terminal of the signal 27 is connected by means of a wire 28 with one or both of the contacts 20 and 21, these contacts being ordinarily in electric connection with each other through the arms and bracket.

It will be observed that the bracket may be insulated from the axle if necessary, although, this will ordinarily not be required.

The operation of the apparatus as thus described is as follows: When the contacts 20 and 21 are properly adjusted with respect to the contact 10, the signal will not be sounded as long as the vehicle is moving straight ahead. However, if the front wheels are turned a sufficient distance, the contact 10 will make connection with one or the other of the contacts 20 or 21 which will close the circuit from the battery to the signal 27, thereby causing the signal to sound. In turning around, as for instance in a street, it may not be desired to have the signal sound continuously, therefore, the contacts are preferably arranged so that after the wheels have been turned to a certain extent, the contact 10 will pass beyond the contact 20 or 21 with which it engages. Then, when the wheels are again straightened, it will not ordinarily be necessary to sound the signal again so I provide the insulating plates 23 which will prevent electric connection between the contacts when the contact 10 passes back to its central position.

It will be seen that by means of this apparatus, I provide a simple and efficient mechanism whereby an electric signal may be automatically sounded when a car is turned, thereby relieving the driver of the necessity of operating the same, and serving to assist in prevention of accidents.

In some instances it may be desired to arrange contacts so that very slight movement of the front wheels will cause the signal to be sounded, for instance to prevent the theft or unauthorized taking of the machine. In order to accomplish this I provide an auxiliary forked contact member 29, which is pivoted at 30 to an arm 31, which arm may be adjustably secured to the bracket 14 as above described in connection with the arms 18 and 19. The inner end of the contact member 29 is provided with a notch 31 which engages with a pin or bolt 32 on the arm 31. The forked end of the contact member 29 is heavier than its inner end, so that when the forked end is swung outwardly it will remain in substantially horizontal position as shown in Fig. 4 with its outer springs lying close to the contact 10, but not normally in engagement therewith. When in this position it will be seen that the contact member 29 forms a terminal for the wire 28, and if the wheels are moved slightly in either direction the contact member 10 would strike one of the arms of the fork and close the circuit from the battery to the signal. The operator or driver may arrange the contact member 29 in this position when he leaves the car and anyone starting to drive the same will cause the signal to sound as soon as they have turned the wheels slightly in either direction. However, should the owner or driver wish to start the car he can throw the contact member out of engaging position to the position shown in dotted lines in Fig. 4, where it will remain until it is desired to again set the same.

Having thus described my invention, which however I do not wish to limit to the exact arrangement shown and described, except as specified in the appended claims, what I claim and desire to secure by Letters Patent is:

1. In a signal apparatus for automobiles, the combination with the front axle and the steering cross rod, of electric contacts secured to said axle and said cross rod respectively and adapted to make contact when the cross rod is moved, an electric signal or the like, a source of electricity, and a circuit from said source to the signal, said circuit including the axle and cross rod contacts.

2. In a signal apparatus for automobiles, the combination with the front axle, of a pair of electric contacts thereon, a steering cross-rod, a contact on said cross-rod arranged to make contact with one or the other of the axle contacts when the cross-rod is moved, an electric horn or the like, a source of electricity, and a circuit from said source of electricity to the horn, said circuit including the axle and cross-rod contacts.

3. In a signal device for automobiles, the combination of a front axle, a pair of flexible contacts mounted on said axle, a steering cross-rod, a contact mounted on said cross-rod intermediate of the axle contacts arranged so that it will strike one or the other of said contacts and pass beyond the same when the rod is moved to turn the wheels to the fullest extent, insulating pieces on said axle contacts to prevent electric connection when the rod contact returns to central position, an electric signal, a battery, and a circuit including said signal and battery and contacts, the arrangement being such that when the rod is moved a predetermined distance the rod contact will make connection with one or the other of the axle contacts and cause the signal to be operated.

MARTIN C. STAMM.

Witnesses:
IRENE FORREST,
ROSWELL MESSING.